United States Patent
Compton et al.

(10) Patent No.: US 11,588,842 B2
(45) Date of Patent: Feb. 21, 2023

(54) NETWORK ANOMALY DETECTION AND MITIGATION SIMULATION TOOL

(71) Applicant: Charter Communications Operating, LLC, St. Louis, MO (US)

(72) Inventors: Richard A. Compton, Highlands Ranch, CO (US); Pratik Lotia, Denver, CO (US); Kevin Brady, Englewood, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 220 days.

(21) Appl. No.: 17/035,656

(22) Filed: Sep. 28, 2020

(65) Prior Publication Data
US 2022/0103576 A1    Mar. 31, 2022

(51) Int. Cl.
*H04L 29/06*   (2006.01)
*H04L 12/24*   (2006.01)
*H04L 9/40*    (2022.01)
*H04L 41/0631* (2022.01)
*H04L 41/0816* (2022.01)
*H04L 41/08*   (2022.01)
*H04L 41/0869* (2022.01)

(52) U.S. Cl.
CPC ...... *H04L 63/1425* (2013.01); *H04L 41/0631* (2013.01); *H04L 41/0816* (2013.01); *H04L 41/0869* (2013.01); *H04L 41/0886* (2013.01); *H04L 63/1466* (2013.01); *H04L 63/20* (2013.01)

(58) Field of Classification Search
CPC ............. H04L 63/1425; H04L 41/0631; H04L 41/0816; H04L 41/0869; H04L 41/0886; H04L 63/1466; H04L 63/20; H04L 43/0817; H04L 41/145; H04L 43/50; H04L 41/142
See application file for complete search history.

(56) References Cited

U.S. PATENT DOCUMENTS

| | | | |
|---|---|---|---|
| 7,792,963 B2 | 9/2010 | Gould et al. | |
| 10,516,694 B1 * | 12/2019 | Gupta | H04L 63/1416 |
| 10,848,423 B1 * | 11/2020 | Chen | H04L 63/20 |
| 11,100,217 B1 * | 8/2021 | Natanzon | H04L 41/0869 |

(Continued)

OTHER PUBLICATIONS

Cloudflare, (n.d.). Is BGP safe yet?—Cloudflare. Retrieved May 19, 2020, from https://isbgpsafeyet.com/.

(Continued)

*Primary Examiner* — Schquita D Goodwin
(74) *Attorney, Agent, or Firm* — Otterstedt & Kammer PLLC

(57) ABSTRACT

One or more network tests for a network are selected, wherein the selected one or more network tests simulate an attempt to establish an anomalous network configuration. A network configuration update is generated based on the selected one or more network tests and the network configuration update is issued to a network-based device. A performance of the network is monitored for establishment of the anomalous network configuration in response to the network configuration update and a configuration of the network is revised based on the monitored performance of the network, to mitigate the establishment of the anomalous network configuration.

34 Claims, 13 Drawing Sheets

(56) References Cited

U.S. PATENT DOCUMENTS

| | | |
|---|---|---|
| 2003/0056217 A1 | 3/2003 | Brooks |
| 2006/0130107 A1 | 6/2006 | Gonder et al. |
| 2007/0217436 A1 | 9/2007 | Markley et al. |
| 2009/0248794 A1 | 10/2009 | Helms et al. |
| 2010/0313236 A1 | 12/2010 | Straub |
| 2016/0359872 A1* | 12/2016 | Yadav ............... H04L 63/20 |
| 2017/0034023 A1* | 2/2017 | Nickolov ......... H04L 43/0817 |
| 2017/0244745 A1* | 8/2017 | Key ............... H04L 63/1433 |
| 2018/0046811 A1* | 2/2018 | Andriani ............ G06F 21/577 |
| 2018/0248905 A1* | 8/2018 | Côté ............... H04L 43/045 |
| 2019/0296997 A1* | 9/2019 | Menon ............. H04L 41/5009 |
| 2019/0334807 A1* | 10/2019 | Clark ............. H04L 43/0817 |
| 2020/0267059 A1* | 8/2020 | Mozumdar ........... H04L 41/12 |
| 2020/0336401 A1* | 10/2020 | Cociglio ............ H04L 45/50 |
| 2021/0099476 A1* | 4/2021 | Montgomery ......... H04L 63/02 |
| 2021/0135982 A1* | 5/2021 | Chaturmohta ......... H04L 45/04 |
| 2021/0320941 A1* | 10/2021 | e Silva ........... H04L 63/1416 |
| 2022/0019674 A1* | 1/2022 | Frey .............. H04L 63/20 |
| 2022/0023755 A1* | 1/2022 | Vukojevic .......... H04L 67/63 |

OTHER PUBLICATIONS

Wikimedia Foundation. (Feb. 24, 2022). Bogon filtering. Wikipedia. Retrieved Jul. 31, 2020, from https://en.wikipedia.org/wiki/Bogon_filtering.

Exa-Networks. (n.d.). Exa-networks/EXABGP: The BGP Swiss Army Knife of Networking. GitHub. Retrieved Aug. 27, 2020, from https://github.com/Exa-Networks/exabgp.

Name¶. exabgp.conf(5)—exabgp—Debian testing—Debian Manpages, (n.d.). Retrieved Aug. 27, 2020, from https://manpages.debian.org/testing/exabgp/exabgp.conf.5.en.html.

ThePacketGeek. (n.d.). Retrieved Aug. 27, 2020, from https://thepacketgeek.com/exabgp/http-api/.

Anonymous, Measuring Cybersecurity Effectiveness: Verodin Risk Management, downloaded from https://www.verodin.com on May 19, 2020.

Anonymous, Breach and Attack Simulation: Safebreach, downloaded from https://safebreach.com on May 19, 2020.

RFC 1918 address allocation for private . . . —RFC editor. (n.d.). Retrieved Mar. 4, 2022, from https://www.rfc-editor.org/rfc/pdfrfc/rfc1918.txt.pdf.

* cited by examiner

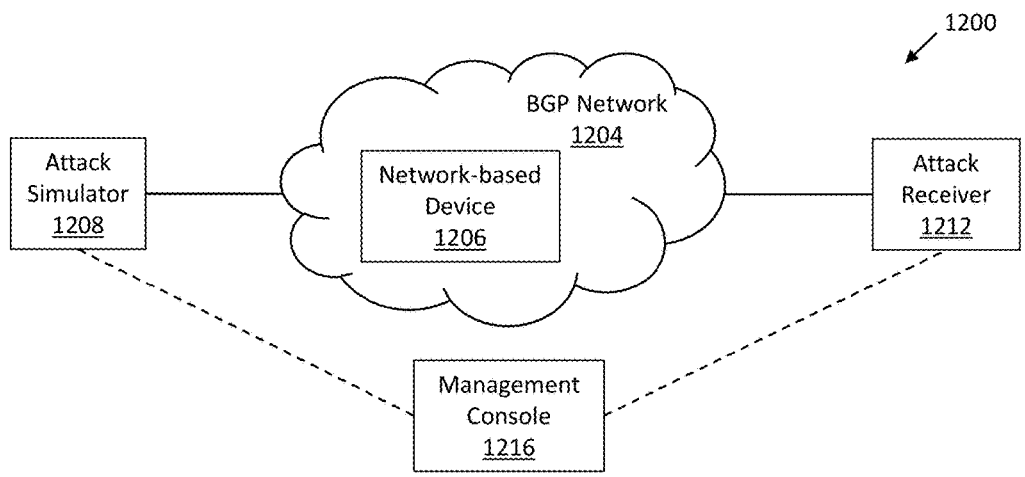
FIG. 10
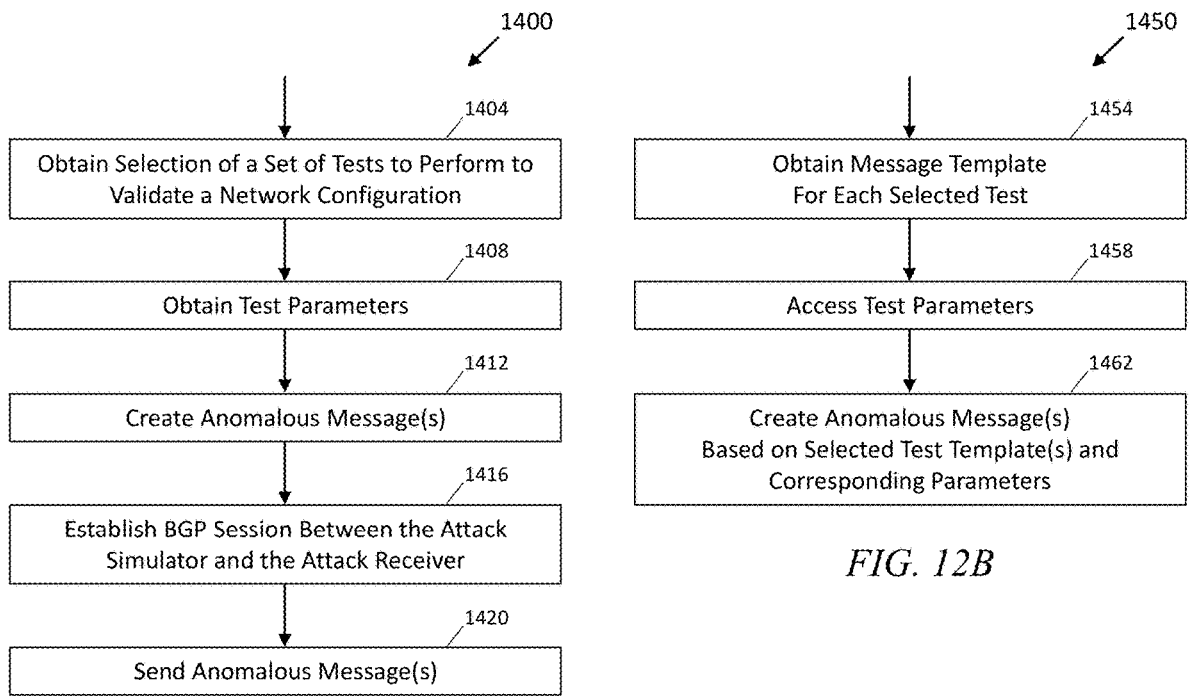
FIG. 12A
FIG. 12B

NETWORK ANOMALY DETECTION AND MITIGATION SIMULATION TOOL

FIELD OF THE INVENTION

The present invention relates generally to the electrical, electronic and computer arts, and, more particularly, to the simulation, detection, and mitigation of network anomalies.

BACKGROUND OF THE INVENTION

Network-based devices, such as devices operating on a network conforming to the Border Gateway Protocol (BGP), conventionally advertise the existence of network prefixes to various network devices, such as network routers. The information provided may be used, for example, for accessibility to the entities corresponding to the network prefixes. Inbound route filters, for example, are used to control which routes are installed on a routing table of a router. An entity may, however, advertise false or erroneous information, such as connectivity information for prefixes not owned by or associated with an attacker of the network. This may include addresses in a private address space, a multicast address space, or other address space that should not be routed on the Internet, references to an autonomous system (AS) path that is too long, references to an autonomous system path that includes autonomous systems that are private and should not be used on the Internet, or generally any false information in the update. The false information may be advertised accidentally or may represent a network attack by a malicious entity. If the attack is not detected and mitigated, the network is configured to improperly handle traffic for the specified address(es), impacting not only traffic associated with the victim of the attack, but potentially the traffic of other systems and entities. Conventionally, networks are configured to attempt to detect and mitigate such attacks with varying degrees of effectiveness. For example, fuzzing attacks may be mounted in a lab environment to test the ability of a network to detect and mitigate such attacks.

SUMMARY OF THE INVENTION

Principles of the invention provide techniques and/or tools for simulating, detecting, and/or mitigating network anomalies, such as malicious network attacks and inadvertent configuration errors. In one aspect, an exemplary method includes operations of selecting one or more network tests for a network, wherein the selected one or more network tests simulate an attempt to establish an anomalous network configuration; generating a network configuration update based on the selected one or more network tests; issuing the network configuration update to a network-based device; monitoring a performance of the network for establishment of the anomalous network configuration in response to the network configuration update; and revising a configuration of the network based on the monitored performance of the network, to mitigate the establishment of the anomalous network configuration.

In one aspect, an apparatus comprises a memory and at least one processor, coupled to said memory, and operative to perform operations comprising selecting one or more network tests for a network, wherein the selected one or more network tests simulate an attempt to establish an anomalous network configuration; generating a network configuration update based on the selected one or more network tests; issuing the network configuration update to a network-based device; monitoring a performance of the network for establishment of the anomalous network configuration in response to the network configuration update; and revising a configuration of the network based on the monitored performance of the network, to mitigate the establishment of the anomalous network configuration.

In one aspect, a non-transitory computer readable medium comprises computer executable instructions which when executed by a computer cause the computer to perform the method of selecting one or more network tests for a network, wherein the selected one or more network tests simulate an attempt to establish an anomalous network configuration; generating a network configuration update based on the selected one or more network tests; issuing the network configuration update to a network-based device; monitoring a performance of the network for establishment of the anomalous network configuration in response to the network configuration update; and revising a configuration of the network based on the monitored performance of the network, to mitigate the establishment of the anomalous network configuration.

In one aspect, a networked computing system comprises: a management console, implemented using a first memory and at least one first processor, coupled to the first memory, and operative to perform operations comprising selecting one or more network tests for a network, wherein the selected one or more network tests simulate an attempt to establish an anomalous network configuration; a simulation sender, implemented using a second memory and at least one second processor, coupled to the second memory, and operative to perform operations comprising generating a network configuration update based on the selected one or more network tests; and issuing the network configuration update to a network-based device; and a simulation receiver, implemented using a third memory and at least one third processor, coupled to the third memory, and operative to perform operations comprising monitoring a performance of the network for establishment of the anomalous network configuration in response to the network configuration update; and reporting a result of the one or more tests based on the monitored performance of the network, to mitigate the establishment of the anomalous network configuration.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., an attack simulator, an attack receiver, a management console, a router, or a network-based device, and the like) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:

simulation of network attacks, such as BGP hijacking attacks;

improved network security for detecting and mitigating network configuration attacks, route leaks and other types of non-malicious route configuration errors, and the like; and implementation of novel network attack and non-malicious configuration error detection and mitigation techniques that can be easily integrated with existing system hardware, thereby providing a more robust detection and mitigation mechanism without significantly increasing system overhead and complexity.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 10 is a high-level block diagram of an example BGP network under test, in accordance with an example embodiment;

FIG. 12A is a flowchart for an example method for a simulation sender for simulating, detecting, and mitigating network attacks and non-malicious network configuration errors, in accordance with an example embodiment;

FIG. 12B is a flowchart for an example method for creating an anomalous message, in accordance with an example embodiment;

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Figure 1:
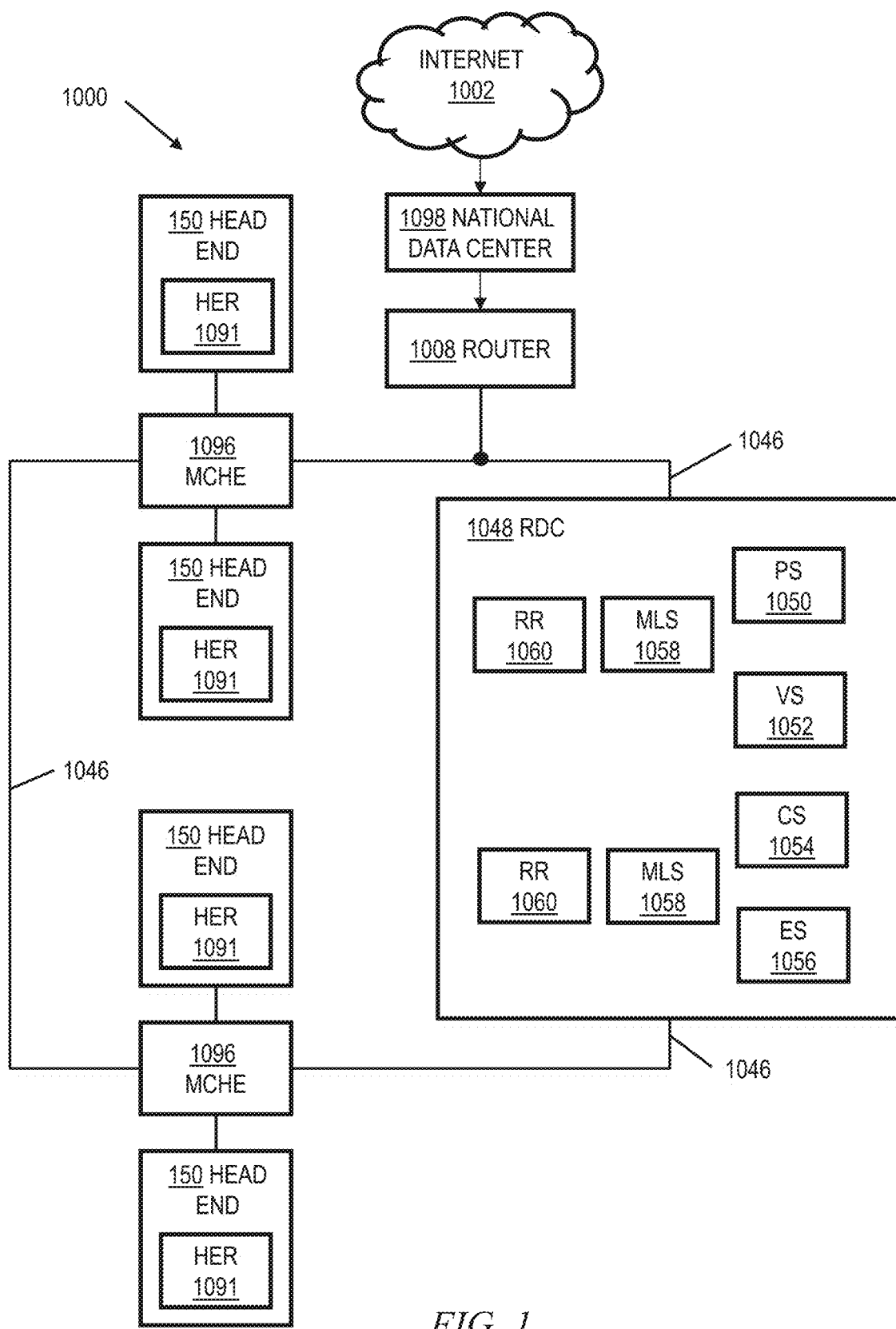
FIG. 1 is a block diagram of an exemplary embodiment of a system, within which one or more aspects of the invention can be implemented.

Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area(s). In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
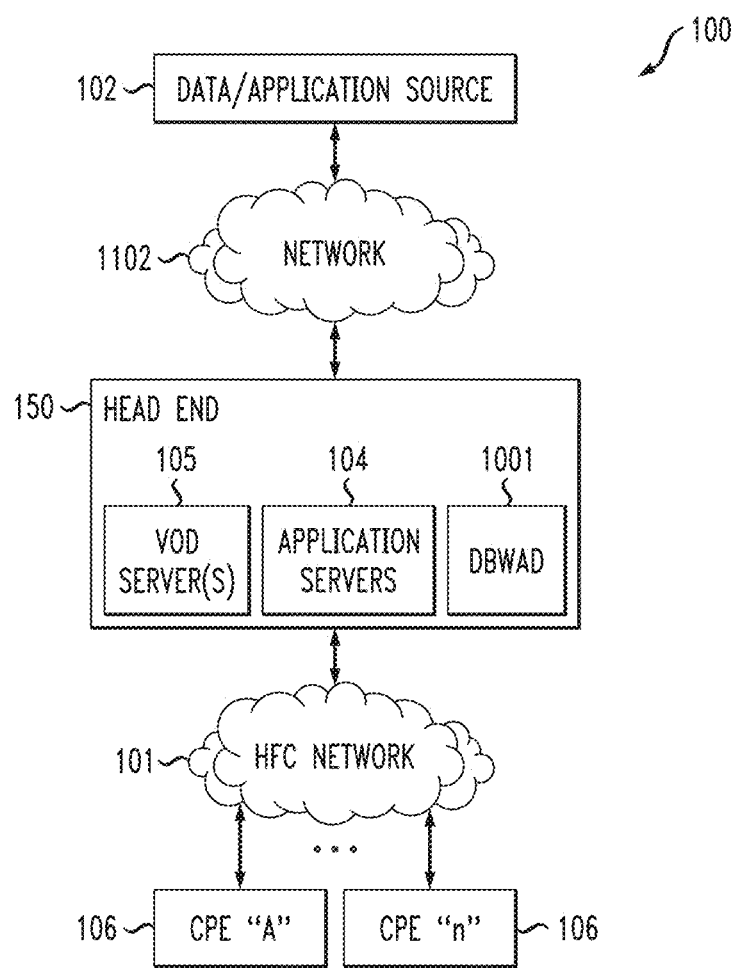
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ Service ONUs (S-ONUs; ONU=optical network unit) as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
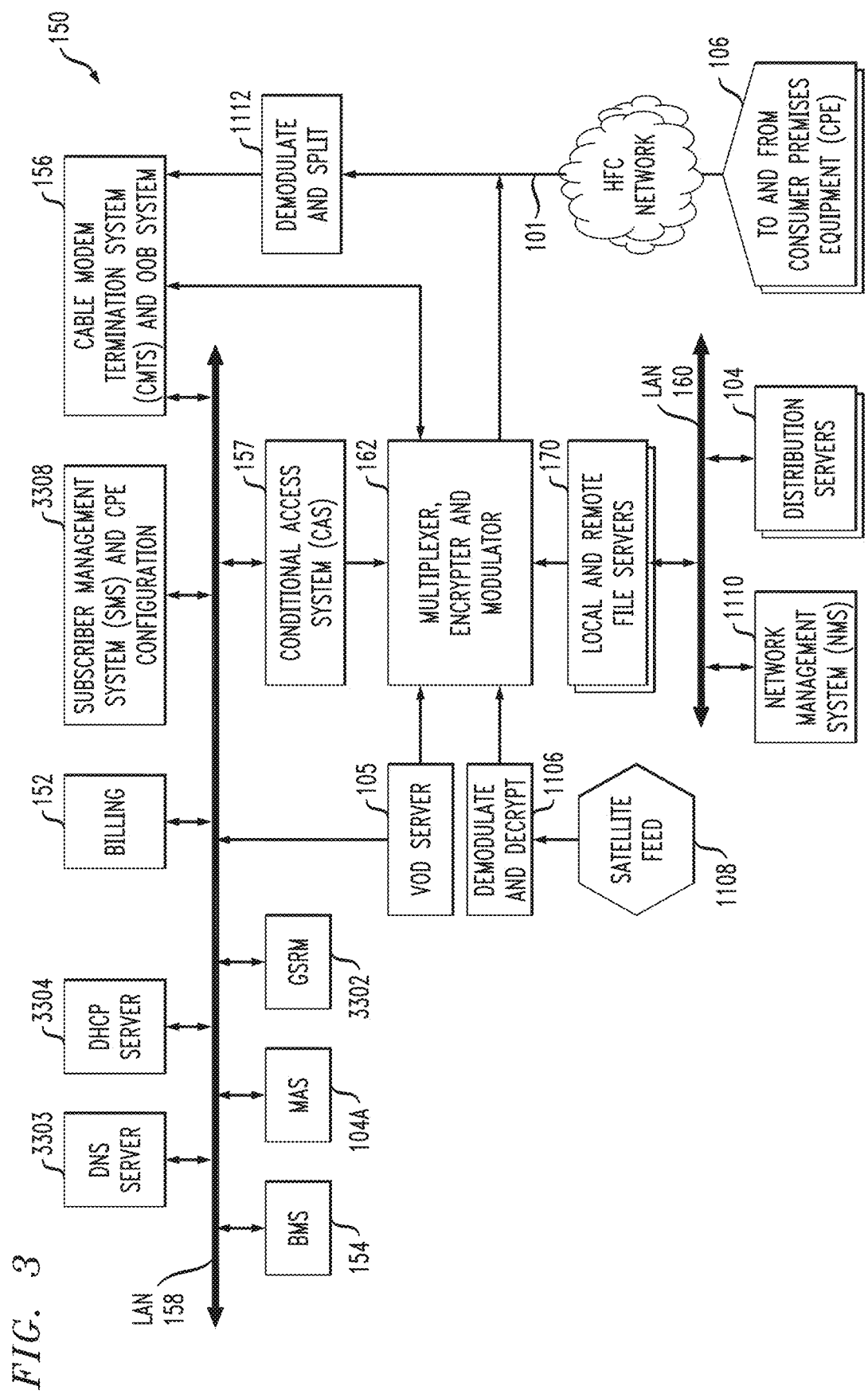
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. HFC systems using DOCSIS to transmit data are one non-limiting exemplary application context for one or more embodiments. However, one or more embodiments are applicable to a variety of different kinds of networks.

It is also worth noting that the use of DOCSIS Provisioning of EPON (Ethernet over Passive Optical Network) or "DPoE" (Specifications available from CableLabs, Louisville, Colo., USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
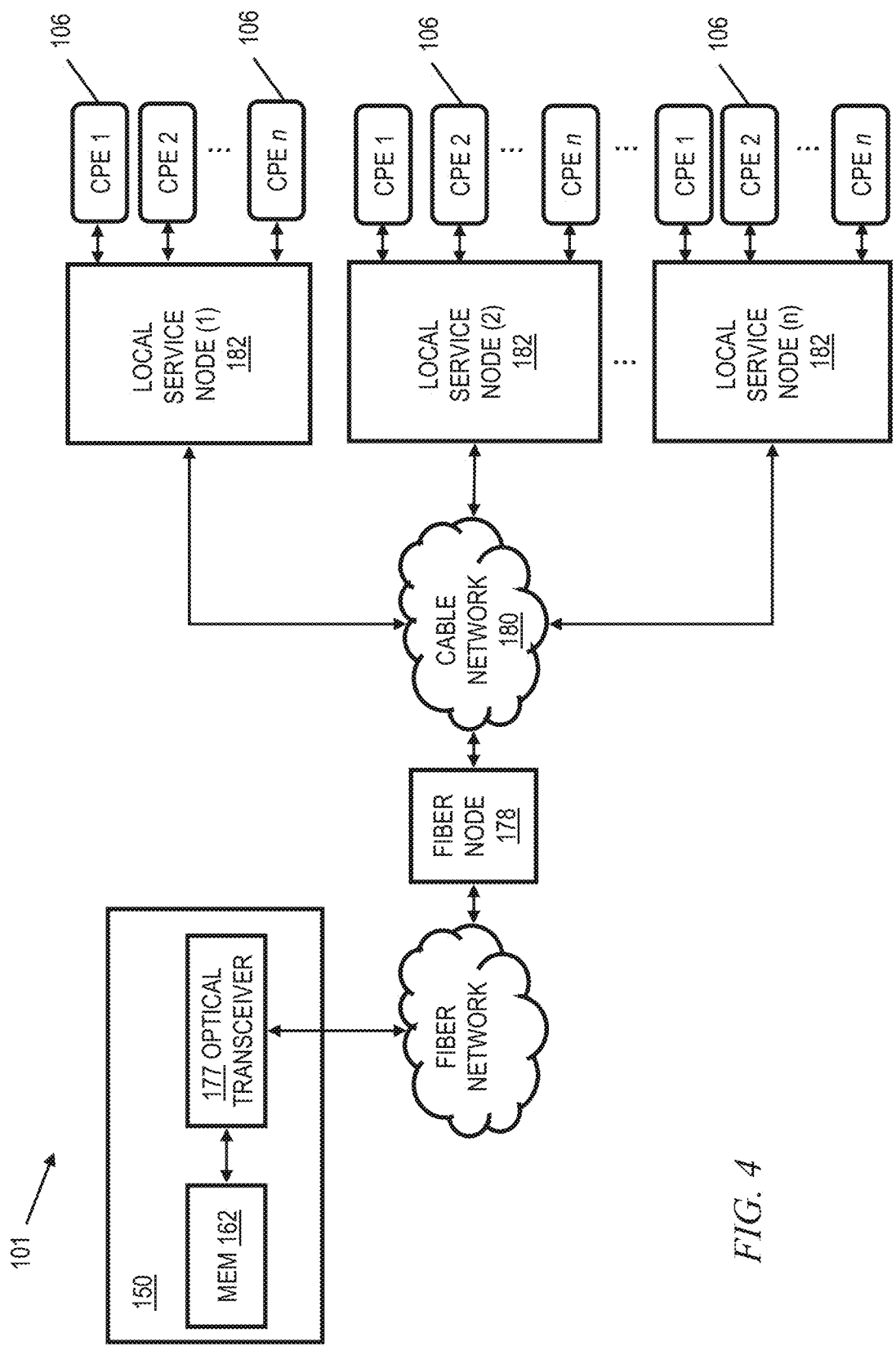
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network 179 to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOC SIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed. It should be understood that embodiments of the invention have broad applicability to a variety of different types of networks. Some embodiments relate to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
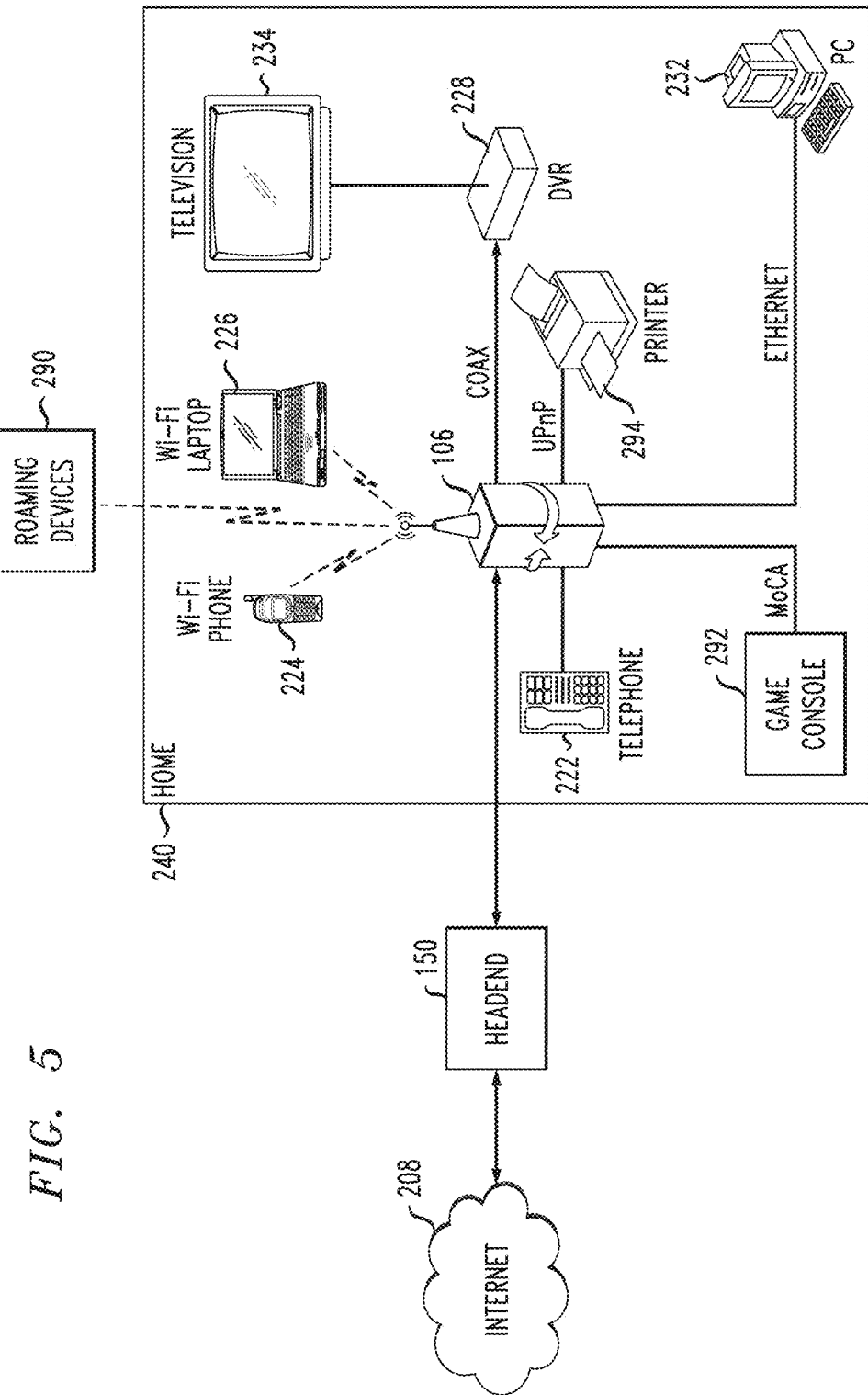
FIG. 5 is a functional block diagram of a premises network, including an exemplary centralized customer premises equipment (CPE) unit, interfacing with a head end such as that of FIG. 3.
Figure 6:
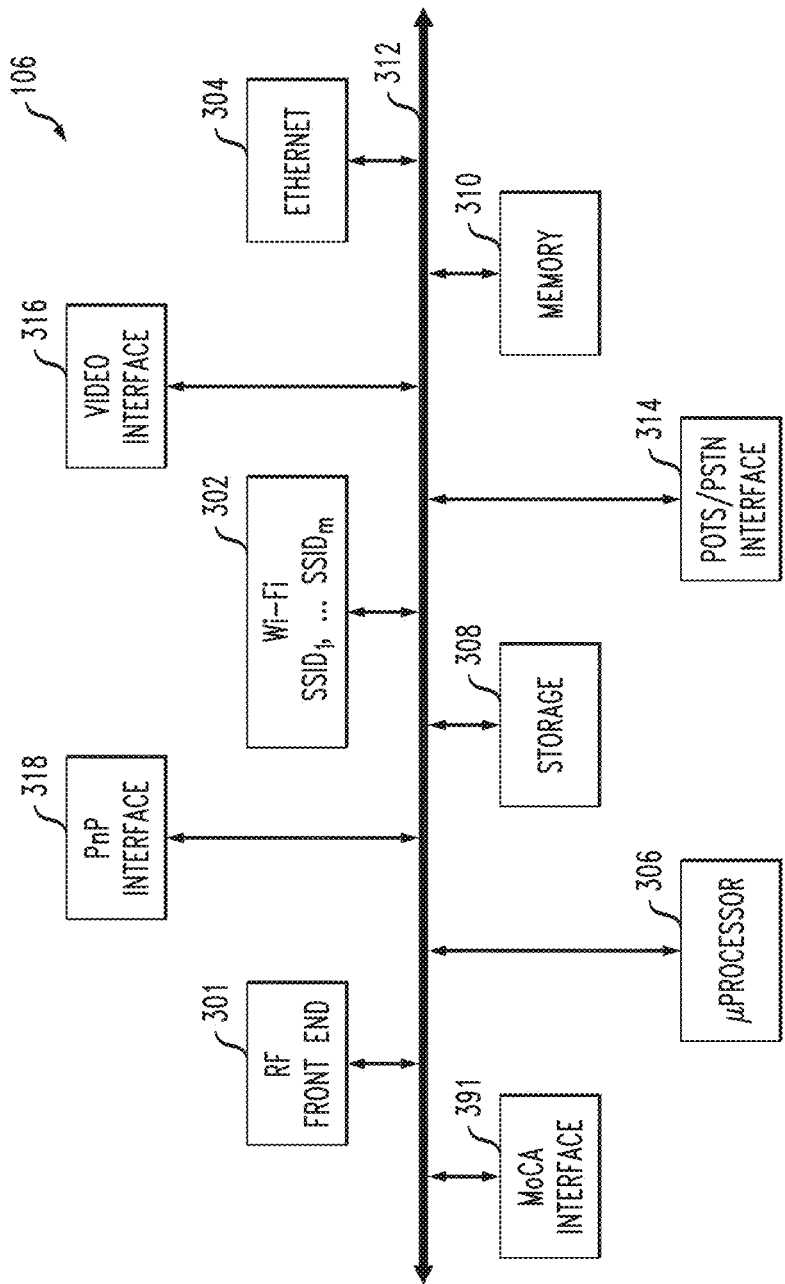
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
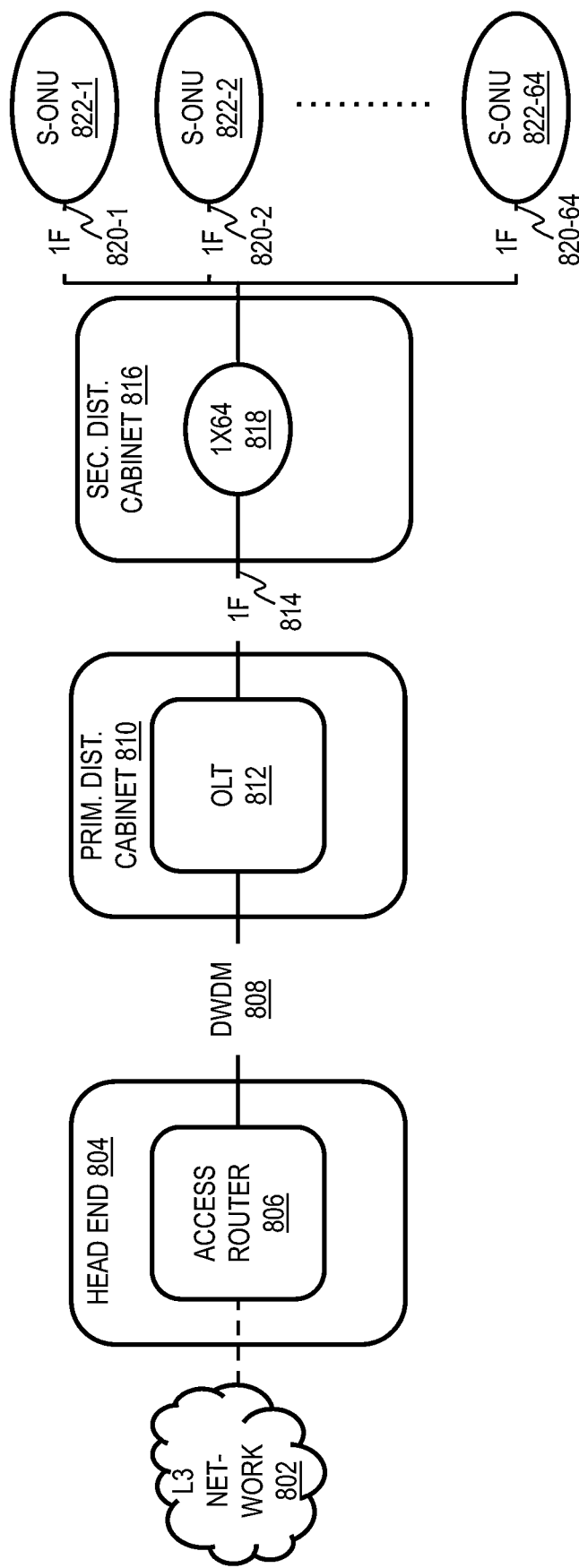
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
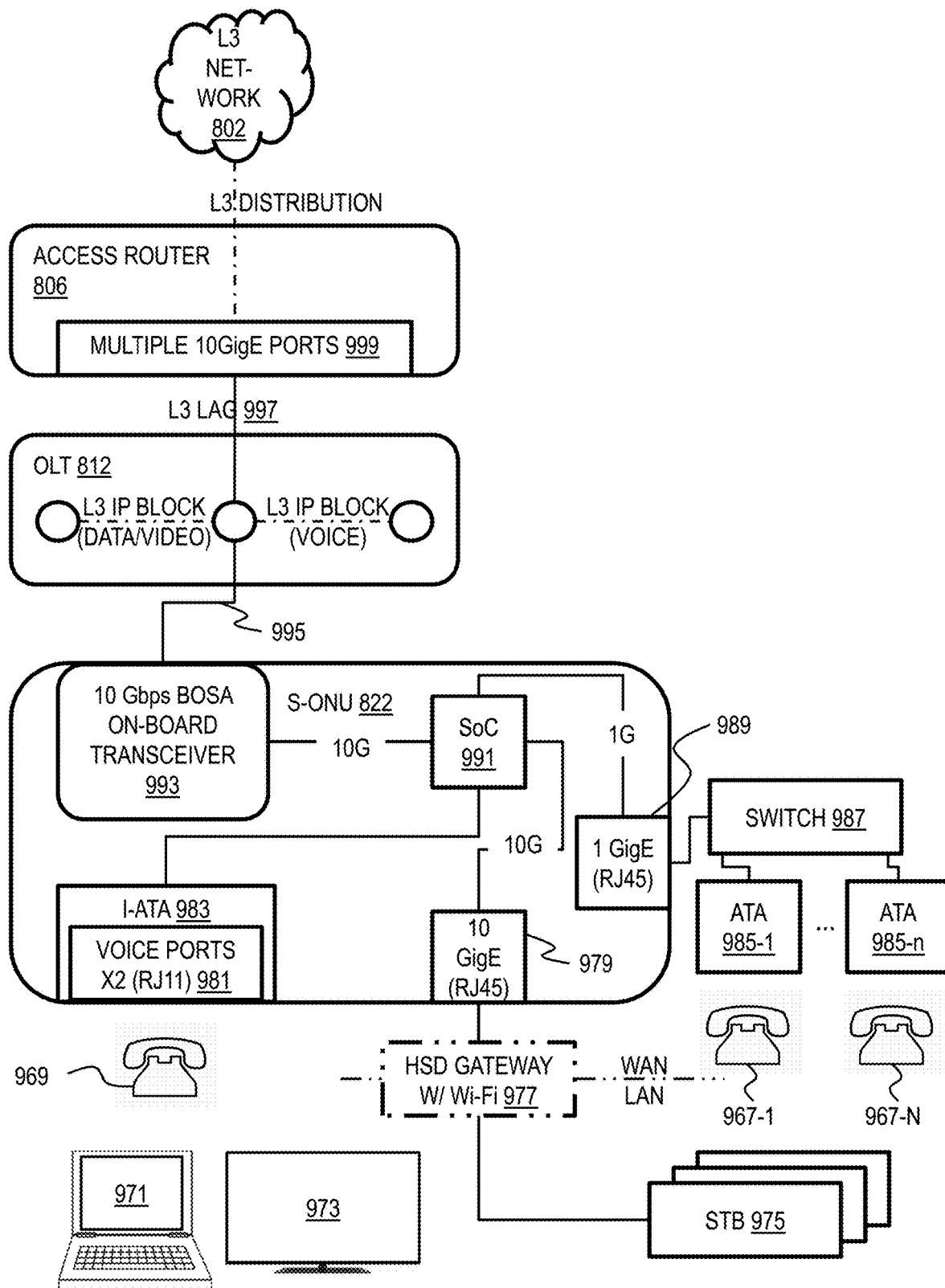
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical sub-assembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-*n*, suitable for the needs of the business, via external analog telephone adapters (ATAs) 985-1 through 985-*n*. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 can, if desired, also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Principles of the present disclosure will be described herein in the context of apparatus, systems, and/or methods for simulating, detecting, and/or mitigating malicious attacks and non-malicious network configuration errors in a networked computing environment. Non-limiting examples of attacks include "BGP-based" and/or "routing protocol" based attacks. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

One or more embodiments provide a method of simulating, detecting, and/or mitigating network anomalies, such as malicious network attacks and non-malicious configuration errors. In one example embodiment, the network conforms to the Border Gateway Protocol (BGP) for autonomous systems (AS), which enables such systems to communicate on the Internet, within private networks, and the like. BGP provides for the exchange of routing and reachability information. Under BGP, a network-based device advertises reachability of IP prefixes to various network devices, such as network routers. The information provided may be used, for example, to configure route filters and the like to appropriately route network traffic for the autonomous systems. BGP has been extended from being used to advertise IPv4 prefixes to allowing the exchange of different types of information and address families, such as IPv6 unicast/multicast, IPv4 multicast, labeled unicast, and the like. The introduction of different address families into BGP results in more attack surfaces for malicious entities to attack and more opportunities for accidental misconfiguration.

Indeed, network-based devices are often subjected to malicious attacks. In one example of a network attack, an entity will maliciously advertise connectivity information for an address(es) not owned by or associated with the attacker. This may include addresses in a private address space, a multicast address space or other address space that should not be routed on the Internet, or generally any malicious false information in the update. If the attack is not detected and mitigated, the network is configured to improperly handle traffic for the specified address(es), impacting not only traffic associated with the victim of the attack, but potentially the traffic of other systems. Conventionally, networks are configured to attempt to detect and mitigate such attacks with varying degrees of effectiveness. Conventionally, fuzzing is used to send invalid information to a system to check for errors in a lab environment and to test the ability of a network to detect and mitigate configuration errors, network attacks, and the like. In one example embodiment, attacks are simulated/emulated (simulate and emulate are used interchangeably herein) in a real-world environment to test and improve the security of the network while maintaining normal operation of the network.

FIG. 10 is a high-level block diagram 1200 of an example BGP network 1204 under test, in accordance with an example embodiment. In one example embodiment, the test is managed via a management console 1216 which enables an administrator or other user to initiate the simulation test(s). For example, one or more network tests for the BGP network 1204 may be selected by a user of the management console 1216, where each selected network test simulates an attempt to establish an anomalous network configuration on the BGP network 1204. An attack simulator 1208 (also referred to as simulation sender 1208 herein) generates traffic on the example BGP network 1204 that is typical of a network-based attack, an erroneous message, and the like. For example, the attack simulator 1208 may generate a network configuration update (such as a BGP advertisement) based on the selected network test that attempts to configure the BGP network 1204 with malicious or erroneous configuration information. The network configuration update, including the malicious or erroneous configuration information, is issued by the attack simulator 1208 to a network-based device of the BGP network 1204. If the network-based device does not reject or otherwise mitigate the malicious or erroneous configuration information, the BGP network 1204 will be improperly configured, which may cause the BGP network 1204 to fail or to perform in a degraded manner. To detect whether the malicious or erroneous configuration information was properly mitigated, an attack receiver 1212 (also referred to as a simulation receiver 1212 herein) is informed of the test(s) and monitors for network traffic related to the test(s). The reception of certain network traffic, such as a malicious advertisement message, associated with the simulation is indicative of the malicious or erroneous network traffic not being properly mitigated by the BGP network 1204. The results of the simulation are analyzed and the configuration of the BGP network 1204, such as the BGP security configuration settings, is revised, if necessary, to improve the detection and mitigation capabilities of the BGP network 1204. For example, a network-based device 1206 of the BGP network 1204, such as a router, a firewall, a switch, and the like, may be configured to mitigate the network attack by, for example, blocking the attack traffic. The results may be analyzed by the management console 1216 (or a user of the management console 1216), the attack simulator 1208, the attack receiver 1212, or another device. The attack receiver 1212 may be associated with, but is not required to be associated with, the same autonomous system number (ASN) as the network under test.

In one example embodiment, the attack receiver 1212 is a generic (e.g. general-purpose) computer with software that understands the routing protocol that is being used to execute the simulation (e.g. BGP) and that inter-operates with the management console 1216. The management console 1216 informs the attack receiver 1212 of the attack that will be executed and what type of information to look for from the BGP network 1204 to determine the results of the test, such as whether a simulated network attack was successful or detected and mitigated. The attack receiver 1212 then relays the test results and other related information to the management console 1216. In one example embodiment, the simulation, detection, mitigation, or any combination thereof may be automatically performed periodically, at scheduled times, and the like.

Figure 11:
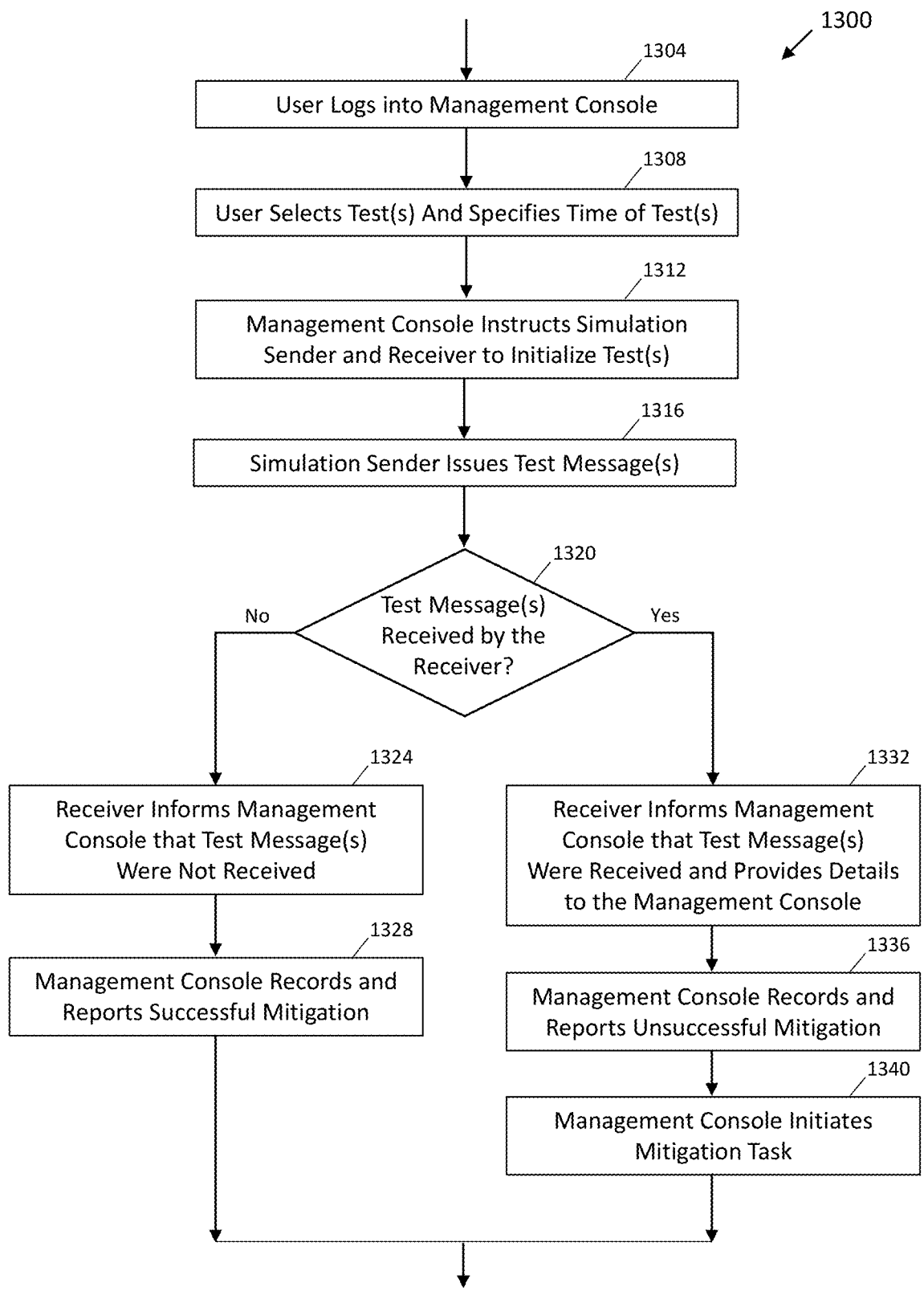
FIG. 11 is a flowchart for an example method for simulating, detecting, and mitigating network attacks and non-malicious network configuration errors, in accordance with an example embodiment.

FIG. 11 is a flowchart for an example workflow 1300 for simulating, detecting, and mitigating network attacks and non-malicious network configuration errors, in accordance with an example embodiment. In one example embodiment, an administrator or other user logs onto the management console 1216 (operation 1304). A security test is initiated and a set of tests that are to be performed are selected to, for example, validate the proper configuration of the BGP network 1204, such as to validate the proper configuration of a network route filter (operation 1308). The tests may be scheduled for immediate execution, for a future time(s), and the like. The selection of the tests may include the specification of various variables. Variables include, but are not limited to, the specific IP address of the router that is the target of the attack, BGP session configuration parameters (such as a password associated with the BGP session), an identification of a type of attack and/or identification of a network route that should be rejected (such as the identification of private address space as defined in RFC 1918), bogons (IP packets on the Internet containing addresses not allocated by the Internet Assigned Numbers Authority or another authorized agency), reserved ASNs (i.e., a range of ASNs not to be used on the public Internet and/or that are dedicated for private space or lab testing), and the like. It is noted that new attacks are continually being conceived by adversaries. Thus, additional security tests may be added and/or updated on a continual basis. In a non-limiting example, supported attacks include, but are not limited to, excessive ASN pre-pending, excessively long ASN paths, private ASN advertisements, invalid ASN advertisements, BGP (route) hijackings, AS path manipulation, route leaks, advertisement of prefix with invalid Route Origin Authorization (ROA), and advertisement of prefixes longer than /24 or /48.

The attack simulator 1208 (the generator of the simulated attack) and the attack receiver 1212 are notified of the list of tests to be initialized for simulation (operation 1312). In one or more embodiments, the attack receiver obtains information about what type of attack will be executed, and what to look for from the network under test, to determine if the attack was successful. Indeed, the attack receiver 1212 would typically know which attack is being executed, so that it will know that the attack originated from the attack simulator 1208 and not a real-world attacker. The attack simulator 1208 sends one or more messages, such as malicious or erroneous updates, via the BGP network 1204 (operation 1316). The messages simulate, for example, an attack that is aggressive enough to expose loopholes in the network security and edge policy faults without negatively affecting the non-malicious traffic being transported by the BGP network 1204. For example, for the simulation of a "route hijack" attack (involving an advertisement for address space that is not actually owned by the attacker), address space that is not assigned to a legitimate user should be specified in the configuration update. As described above, a non-limiting example of an attack is advertising on the Internet of an IP prefix that is currently assigned to an ASN (such as of the company that creates and/or operates the simulated attacker software) where the /24 prefix is not presently used for any services. The simulated attacker initiates the route hijack attack and starts advertising the /24 prefix from another (invalid) ASN. If the attack receiver 1212 receives the network traffic corresponding to the hijacked route, then the attack was successful.

In one example embodiment, a monitor system checks the health of the BGP network 1004 and ensures the attack did not cause an outage or other type of network failure. In one example embodiment, the monitor check function is performed by the attack receiver 1212 or by another network-based device. The results of the health check are reported to the management console 1216. In one example embodiment, the attack receiver 1212 performs a check to determine if a message associated with the test was transported by the BGP network 1204 from the attack simulator 1208 to the attack receiver 1212 (decision block 1320). If the test message was not received (NO branch of decision block 1320), it indicates that the BGP network 1004 identified and mitigated the malicious update; if the test message was received (YES branch of decision block 1320), it indicates that the update was erroneously interpreted by the BGP network 1204 and was implemented as a non-malicious update.

If the test message was not received (NO branch of decision operation 1320), the attack receiver 1212 informs the management console 1216 that the test message was not received (operation 1324) and the management console 1216 records and reports the successful mitigation of the network attack or the attempt to erroneously reconfigure the BGP network 1204 (operation 1328). If the test message was received (YES branch of decision operation 1320), the attack receiver 1212 informs the management console 1216 that the test message was received (operation 1332), and the management console 1216 records and reports the unsuccessful mitigation of the network attack or the attempt to erroneously reconfigure the BGP network 1204 (operation 1336). Reports from the attack receiver 1212 regarding the update may be analyzed to determine which updates were detected and mitigated and which were inadvertently accepted. The report may include a description of the information being advertised, the type of malicious messages that the BGP network 1204 did not correctly identify and block, full routing protocol headers associated with the test messages, and the like.

In one example embodiment, the processor utilization, memory utilization, or both, of a network-based device of the BGP network 1204, such as a router, is also used as an indication of an unsuccessful mitigation of a network attack and/or an erroneous configuration of the BGP network 1204. For example, the processing of a large number of advertisement messages by the router can consume a large number of processor cycles on the router. This spike in processor utilization can be used by the management console 1216, the attack receiver 1212, and the like to detect the unsuccessful mitigation of the network attack and/or the erroneous configuration of the BGP network 1204. The detection based on the processor utilization, memory utilization, or both, may be used in conjunction with or independent of the detection techniques described above. The information regarding the processor utilization, the memory utilization, or both, may be periodically issued by the network-based device of the BGP network 1204; may be issued by the network-based device upon a detection of a change in the processor utilization, memory utilization, or both; may be requested by the management console 1216, attack receiver 1212, or another device; or any combination of the above. Log files, system log messages, SNMP messages, and other telemetry from the network-based device may be analyzed for an indication of the processor utilization, the memory utilization, and the unsuccessful mitigation of the network attack and/or the erroneous configuration.

In one example embodiment, the management console 1216 initiates a mitigation task (operation 1340). For example, recommendations for mitigation reconfiguration activities, such as updating the network configuration, to improve the detection and mitigation capabilities may be issued. The recommendations may be issued to the user of the management console 1216 or to another device. In one example embodiment, a configuration tool automatically specifies and implements revised settings to detect and/or mitigate the network attack/erroneous configuration. For example, the route filter(s) on a network device may be revised to filter a particular malicious advertisement. Other examples include, but are not limited to: if a large number of IP prefix advertisements are able to be received by the network under test, then an appropriate max-prefixes setting can be applied to the router configuration; if Resource Public Key Infrastructure (RPKI) validation is not being performed by the network under test, then the appropriate RPKI validation settings can be applied to the router configuration; if an attempted BGP session is requested with the incorrect Time to Live (TTL) on incoming packets to the router on the network under test, the appropriate GTSM (Generalized TTL Security Mechanism) settings can be applied to the router configuration. After each one of these settings are applied to the router, the attacks can be automatically re-run to validate that the settings successfully mitigated the attack vector.

In one example embodiment, the method 1300 may be automatically performed, such as automatically performed periodically, periodically performed to retest the BGP network 1204, and the like, and the detection and mitigation performance may be tracked over time to determine if the BGP network 1204 is becoming more or less secure. In one example embodiment, the attack receiver 1212, the management console 1216, or a similar device repeats a test in search of a boundary between a successful mitigation configuration and an unsuccessful mitigation configuration. For example, tests can be repeated with different ASN hop counts where, for example; the hop count is slowly increased and a determination is made of when anomalous messages are dropped (the malicious attacks and non-malicious network configuration errors are mitigated). The number of hops can be configurable, for example. Also, in one or more embodiments, the prefix length can be started as, for example, /32, and decremented until /24 is reached; all should be blocked except /24, for example.

FIG. 12A is a flowchart for an example method 1400 for a simulation sender 1208 for simulating, detecting, and mitigating network attacks and non-malicious network configuration errors, in accordance with an example embodiment. In one example embodiment, one or more of the operations of method 1400 are performed by the simulation sender 1208.

In one example embodiment, a selection of a set of one or more tests to validate a network configuration are obtained, for example, from the management console 1216 (operation 1404). The tests may be selected from a drop-down menu of predefined tests identified by the type of anomaly that is tested. The user is queried for parameters for each of the one or more selected tests and the corresponding parameters, if any, are obtained (operation 1408). For example, a count of hops in the ASN path, the particular autonomous system numbers in a path, a selection of the router or other device that is the target of the network attack (such as identified by an IP address), and the like may be requested and obtained. One or more anomalous messages are created based on the set of one or more tests, as described more fully below by way of example in conjunction with FIG. 12B (operation 1412).

At the time of test, a relationship is established between the simulation sender 1208 and the simulation receiver 1212. For example, a connection, such as a BGP connection, may be established between the simulation sender 1208 and the simulation receiver 1212 (operation 1416) (generally, a session can be established). The anomalous message(s) created in operation 1412 are sent via the BGP network 1204 (operation 1420).

FIG. 12B is a flowchart for an example method 1450 for creating an anomalous message, in accordance with an example embodiment. In one example embodiment, the operations of the method 1450 are performed by the simulation sender 1208.

In one example embodiment, a message template is obtained for each selected test (operation 1454). For example, a message template may be obtained from a message template database. The message template defines the structure of a generic anomalous message which may be customized based on the parameters of the corresponding test. The message template may be specific to the type of network device to be configured, such as specific to the brand of the network device. The skilled artisan is familiar with the structure and parameters of such messages. The parameters for each test are accessed (operation 1458) and an anomalous message is created based on the corresponding selected test and test parameters (operation 1462)

Figure 13:
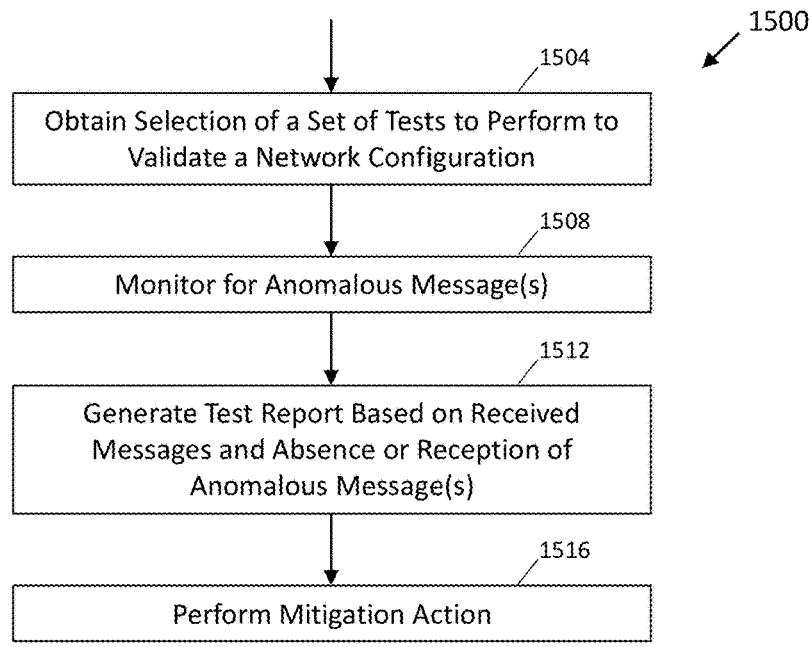
FIG. 13 is a flowchart for an example method for a simulation receiver for simulating, detecting, and mitigating network attacks and non-malicious network configuration errors, in accordance with an example embodiment.

FIG. 13 is a flowchart for an example method 1500 for a simulation receiver 1212 for simulating, detecting, and mitigating network attacks and non-malicious network configuration errors, in accordance with an example embodiment. In one example embodiment, one or more of the operations of method 1500 are performed by the simulation receiver 1212. In one example embodiment, a selection of a set of one or more tests to validate a network configuration are obtained, for example, from the management console 1216 (operation 1504). The BGP network 1204 is monitored for the anomalous simulation message(s) sent by the simulation sender 1208 (operation 1508). A test report is generated based on messages received over the BGP network 1204 and an absence or reception of the anomalous simulation message(s) (operation 1512). For example, the configuration change may be extracted from the anomalous simulation message and incorporated into the report.

In one example embodiment, a mitigation action is performed by the simulation receiver 1212 to, for example, access reconfiguration instructions for a network-based device, such as a router or other device (operation 1516). The reconfiguration instructions may be specific to each network device manufacturer and may be obtained from a database that resides in the simulation receiver 1212 or another device, such as the management console 1216. The reconfiguration instructions may be automatically implemented, submitted to the management console 1216 for display to a user (for review and/or implementation), or both. For example, the simulation receiver 1212 may log into a designated router and automatically implement the reconfiguration. In the case of submission to the management console 1216, the user may review the reconfiguration instructions for informational purposes or to grant approval for implementing the reconfiguration instructions. It is noted that the mitigation action may be performed by the simulation receiver 1212, the management console 1216, or another device.

Figure 14:
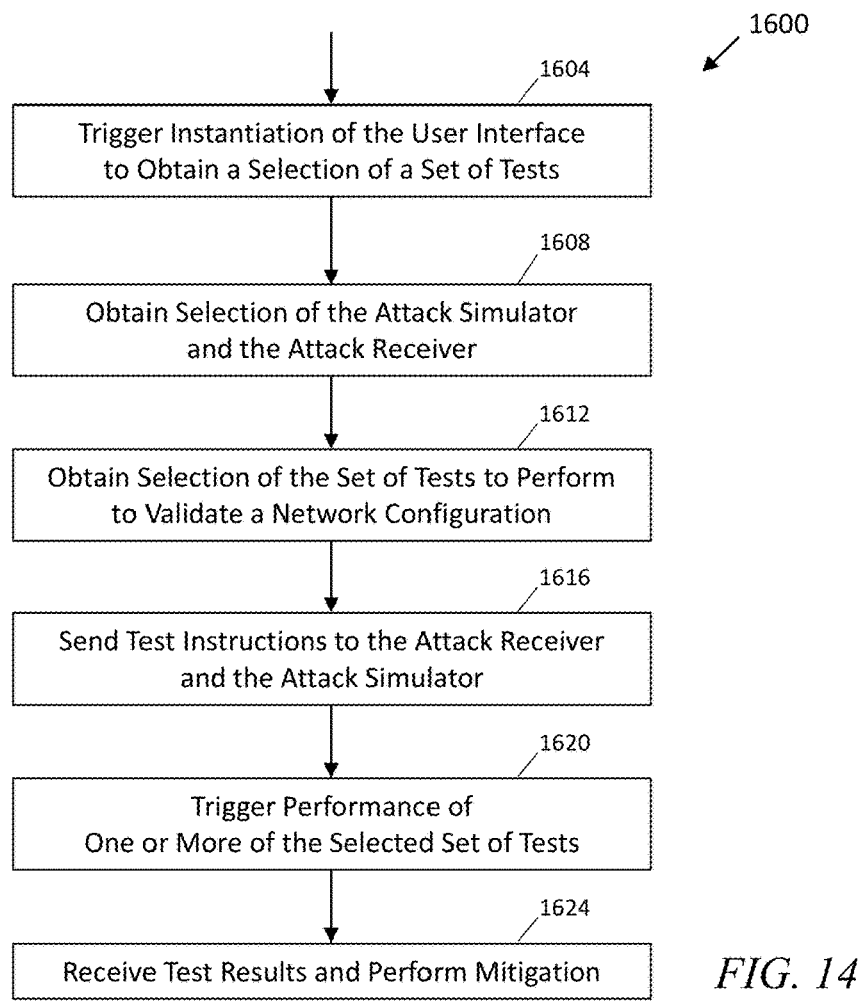
FIG. 14 is a flowchart for an example method for simulating, detecting, and mitigating network attacks and non-malicious network configuration errors, in accordance with an example embodiment.

FIG. 14 is a flowchart for an example method 1600 for simulating, detecting, and mitigating network attacks and non-malicious network configuration errors, in accordance with an example embodiment. In one example embodiment, one or more operations of the method 1600 are performed by the management console 1216.

In one example embodiment, the user interface is generated (operation 1604). For example, an administrator using the management console 1216 may trigger an instantiation of the user interface to configure one or more tests on the BGP network 1204. A selection of the simulation sender 1208 and the simulation receiver 1214 for performing the tests is obtained via the user interface (operation 1608) and a selection of the set of tests to perform to validate the configuration of the BGP network 1204 is obtained via the user interface (operation 1612). Instructions are sent to the simulation sender 1208 and the simulation receiver 1214 to identify the tests that are to be performed (operation 1616). The performance of the selected tests is then triggered (operation 1620). The performance of the selected tests may be triggered immediately, at a scheduled time, and the like. In one example embodiment, the tests may be scheduled to be performed periodically by the simulation sender 1208 and the simulation receiver 1214.

The results of the test(s) are received from the simulation receiver 1214, as described above by way of example in conjunction with FIG. 13 (operation 1624). In one example embodiment, the mitigation action, as also described above by way of example in conjunction with FIG. 13, may be performed by the management console 1216. Simulation sender 1208, simulation receiver 1212, and the management console 1216 can be implemented, for example, as general-purpose computers programmed to implement the logic disclosed herein and illustrated in the flow charts. Network 1204 can be a suitable wired and/or wireless network; see FIGS. 1-9 for non-limiting examples. The network can include, for example, multiple interconnected routers. Management console 1216 can have, for example, a suitable web interface.

Figure 15:
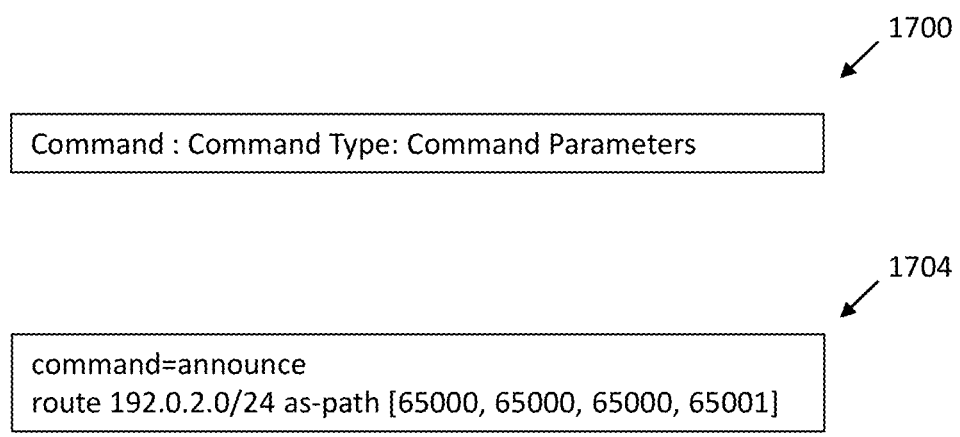
FIG. 15 is a representation of an example message template and corresponding customized message for an erroneous configuration advertisement, in accordance with an example embodiment.

FIG. 15 is a representation of an example message template 1700 and a corresponding customized message 1704 for an erroneous configuration advertisement, in accordance with an example embodiment. The example message template 1700 specifies a command, a command type, and one or more command parameters. In the example customized message 1704, the message identifies an excessively long ASN path; such a message may cause a router to fail as the router may not be configured to handle a path of this length. In particular, the customized message 1704 includes an announce route command with IP prefix 192.0.2.0/24 and a path that includes ASNs: 65000, 65000, 65000, 65001.

In one example embodiment, the attack simulator 1208 obtains the message template 1700 from a message template database based on the type of test to be performed (such as an excessively long ASN path test), customizes the template based on the details of the test (such as the ASN identifiers to be included in the ASN path) and issues the customized message template 1700 to, for example, a BGP speaker. The BGP speaker generates a message conforming to the BGP protocol based on the customized message template 1700. The BGP speaker can be implemented, for example, as software (such as ExaBGP) running on the Attack Simulator 1208. The attack simulator can be, for example, a general purpose computer. In one or more embodiments, there is also a BGP receiver (which, for example, only receives BGP messages and does not send any) running on the Attack Receiver 1212 to detect if the attacks were successful. The BGP receiver can also be, for example, a general purpose computer running software such as ExaBGP. The BGP speaker, in alternative cases, could possibly reside on a router within the BGP network 1204; however, the location on the Attack Simulator is appropriate in one or more instances because custom (attack) BGP messages typically need to be generated and it is advantageous to use software such as ExaBGP to generate these more "bespoke" messages. A BGP speaker could be written, for example, in the PYTHON programming language. ExaBGP can be used in some cases. For example, the JSON (JAVASCRIPT OBJECT NOTATION) message is converted into BGP messages and then the TCP/IP stack converts those BGP messages into IP packets.

Recapitulation

Given the discussion thus far, it will be appreciated that, in general terms, an exemplary method, according to an aspect of the invention, includes the operations of selecting one or more network tests for a network, wherein the selected one or more network tests simulate an attempt to establish an anomalous network configuration; generating a network configuration update based on the selected one or more network tests; issuing the network configuration update to a network-based device; monitoring a performance of the network for establishment of the anomalous network configuration in response to the network configuration update; and revising a configuration of the network based on the monitored performance of the network, to mitigate the establishment of the anomalous network configuration.

In one example embodiment, the revised configuration mitigates malicious use of protected network addresses. In one example embodiment, a security performance of the network is monitored over time. In one example embodiment, the configuration of the network is revised is based on the monitored security performance. In one example embodiment, a relationship between a simulation sender 1208 and a simulation receiver 1212 is established, wherein the generation of the network configuration update is performed by the simulation sender 1208 and the monitoring of the performance of the network is performed by the simulation receiver 1212. In one example embodiment, the simulated attempt to establish the anomalous network configuration includes an anomalous message and wherein the simulation sender 1208 and the simulation receiver 1212 transfer the anomalous message in conformance with a Border Gateway Protocol (BGP).

In one example embodiment, the network configuration update is a Border Gateway Protocol (BGP) advertisement that includes an address from at least one of a private address space, a multicast address space, and an address space unauthorized for routing on the Internet. In one example embodiment, the network 1204 is a deployed network carrying both test and operational network traffic and the attempt to establish an anomalous network configuration is simulated to test and improve a security of the network 1204 while maintaining normal operation of the network 1204. In one example embodiment, the one or more tests and corresponding mitigation tasks are managed via a management console 1216 by an administrator or other user. In one example embodiment, a reception by a simulation receiver 1212 of certain network traffic associated with one of the tests is indicative of malicious or erroneous network traffic not being properly mitigated by the network 1204.

In one example embodiment, the selection of the tests includes specification of variables, the variables including one or more of a specific Internet Protocol (IP) address of a router that is a target of an attack, one or more Border Gateway Protocol (BGP) session configuration parameters, an identification of a type of attack that should be rejected, an identification of a network route that should be rejected, one or more Internet Protocol (IP) packets on an Internet containing one or more addresses not allocated by an Internet Assigned Numbers Authority or another authorized agency, and one or more reserved Autonomous System Numbers (ASNs).

In one example embodiment, supported attacks include one or more of an excessive ASN pre-pending attack, an excessively long Autonomous System Number (ASN) path attack, a private Autonomous System Number (ASN) advertisement attack, an invalid Autonomous System Number (ASN) advertisement attack, a route hijacking, an autonomous system (AS) path manipulation, a route leak, an advertisement of a prefix with an invalid Route Origin Authorization (ROA), an advertisement of a prefix longer than /24, and an advertisement of a prefix longer than /48.

In one example embodiment, the revision of the configuration of the network 1204 is performed in response to an attack receiver 1212 receiving network traffic corresponding to a hijacked route. In one example embodiment, a health of the network 1204 is checked to determine if a simulated network attack caused an outage or other type of failure of the network 1204. In one example embodiment, the performance of the network 1204 is analyzed to determine which network configuration updates were detected and mitigated and which network configuration updates were inadvertently accepted. In one example embodiment, a result of the one or more tests is reported, the report including a description of information being advertised, a type of malicious message that the network 1204 did not correctly identify and block, and full routing protocol headers associated with at least one test message. In one example embodiment, a processor utilization, a memory utilization, or both of a network-based device of the network 1204 are analyzed as an indication of an unsuccessful mitigation of a network attack, an erroneous configuration of the network 1204, or both.

In one example embodiment, a route filter on a network device 1206 is revised to filter a particular malicious advertisement. In one example embodiment, one or more tests are repeated with different Autonomous System Number (ASN) hop counts to determine when anomalous messages are dropped. In one example embodiment, a message template is obtained for at least one of the selected tests, the message template defining a structure of a generic anomalous message, and customizing the obtained message template based on one or more parameters of the corresponding test. Other statutory categories of claims, including the apparatus and non-transitory computer readable medium claims recited below, could include similar dependent claims and similar combinations of features.

In one example embodiment, an apparatus comprises a memory; and at least one processor, coupled to said memory, and operative to perform operations comprising selecting one or more network tests for a network, wherein the selected one or more network tests simulate an attempt to establish an anomalous network configuration; generating a network configuration update based on the selected one or more network tests; issuing the network configuration update to a network-based device; monitoring a performance of the network for establishment of the anomalous network configuration in response to the network configuration update; and revising a configuration of the network based on the monitored performance of the network, to mitigate the establishment of the anomalous network configuration.

In one example embodiment, a non-transitory computer readable medium comprises computer executable instructions which when executed by a computer cause the computer to perform the method of selecting one or more network tests for a network, wherein the selected one or more network tests simulate an attempt to establish an anomalous network configuration; generating a network configuration update based on the selected one or more network tests; issuing the network configuration update to a network-based device; monitoring a performance of the network for establishment of the anomalous network configuration in response to the network configuration update; and revising a configuration of the network based on the monitored performance of the network, to mitigate the establishment of the anomalous network configuration. In one example embodiment, a networked computing system comprises: a management console 1216, implemented using a first memory and at least one first processor, coupled to the first memory, and operative to perform operations comprising: selecting one or more network tests for a network, wherein the selected one or more network tests simulate an attempt to establish an anomalous network configuration; a simulation sender 1208, implemented using a second memory and at least one second processor, coupled to the second memory, and operative to perform operations comprising: generating a network configuration update based on the selected one or more network tests; and issuing the network configuration update to a network-based device; and a simulation receiver 1212, implemented using a third memory and at least one third processor, coupled to the third memory, and operative to perform operations comprising: monitoring a performance of the network for establishment of the anomalous network configuration in response to the network configuration update; and reporting a result of the one or more tests based on the monitored performance of the network, to mitigate the establishment of the anomalous network configuration.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 7:
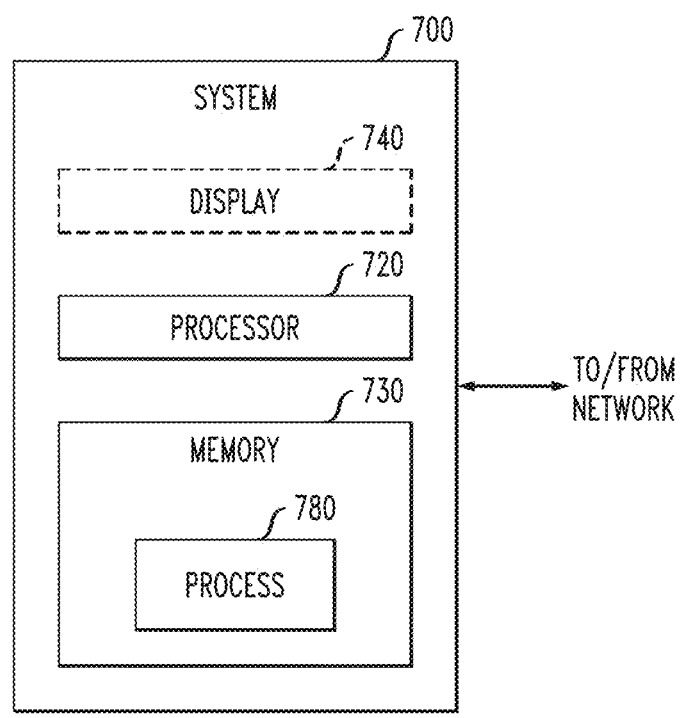
FIG. 7 is a block diagram of a computer system useful in connection with one or more aspects of the invention.

FIG. 7 is a block diagram of at least a portion of an exemplary system 700 that can be configured to implement at least some aspects of the invention, and is representative, for example, of one or more of the apparatus or modules shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   selecting one or more network tests for a network, wherein the selected one or more network tests simulate an attempt to establish an anomalous network configuration;
   generating a network configuration update based on the selected one or more network tests;
   issuing the network configuration update to a network-based device;
   establishing a relationship between a simulation sender and a simulation receiver;
   monitoring a performance of the network for establishment of the anomalous network configuration in response to the network configuration update; and
   revising a configuration of the network based on the monitored performance of the network, to mitigate the establishment of the anomalous network configuration, wherein the generation of the network configuration update is performed by the simulation sender and the monitoring of the performance of the network is performed by the simulation receiver.

2. The method of claim 1, wherein the revised configuration mitigates malicious use of protected network addresses.

3. The method of claim 1, further comprising monitoring a security performance of the network over time.

4. The method of claim 3, wherein the revising of the configuration of the network is based on the monitored security performance.

5. The method of claim 1, wherein the simulated attempt to establish the anomalous network configuration includes an anomalous message and wherein the simulation sender and the simulation receiver transfer the anomalous message in conformance with a Border Gateway Protocol (BGP).

6. The method of claim 1, wherein the network configuration update is a Border Gateway Protocol (BGP) advertisement that includes an address from at least one of a private address space, a multicast address space, and an address space unauthorized for routing on the Internet.

7. The method of claim 1, wherein the network is a deployed network carrying both test and operational network traffic and the attempt to establish an anomalous network configuration is simulated to test and improve a security of the network while maintaining normal operation of the network.

8. The method of claim 1, wherein the one or more tests and corresponding mitigation tasks are managed via a management console by an administrator or other user.

9. The method of claim 1, wherein a reception by the simulation receiver of certain network traffic associated with one of the tests is indicative of malicious or erroneous network traffic not being properly mitigated by the network.

10. The method of claim 1, wherein the selection of the tests includes specification of variables, the variables including one or more of a specific Internet Protocol (IP) address of a router that is a target of an attack, one or more Border Gateway Protocol (BGP) session configuration parameters, an identification of a type of attack that should be rejected, an identification of a network route that should be rejected, one or more Internet Protocol (IP) packets on an Internet containing one or more addresses not allocated by an Internet Assigned Numbers Authority or another authorized agency, and one or more reserved Autonomous System Numbers (ASNs).

11. The method of claim 1, wherein supported attacks include one or more of an excessive ASN pre-pending attack, an excessively long Autonomous System Number (ASN) path attack, a private Autonomous System Number (ASN) advertisement attack, an invalid Autonomous System Number (ASN) advertisement attack, a route hijacking, an autonomous system (AS) path manipulation, a route leak, an advertisement of a prefix with an invalid Route Origin Authorization (ROA), an advertisement of a prefix longer than /24, and an advertisement of a prefix longer than /48.

12. The method of claim 1, wherein the revision of the configuration of the network is performed in response to an attack receiver receiving network traffic corresponding to a hijacked route.

13. The method of claim 1, further comprising checking a health of the network to determine if a simulated network attack caused an outage or other type of failure of the network.

14. The method of claim 1, further comprising analyzing the performance of the network to determine which network configuration updates were detected and mitigated and which network configuration updates were inadvertently accepted.

15. The method of claim 1, further comprising reporting a result of the one or more tests, the report including a description of information being advertised, a type of malicious message that the network did not correctly identify and block, and full routing protocol headers associated with at least one test message.

16. The method of claim 1, further comprising analyzing a processor utilization, a memory utilization, or both of a network-based device of the network as an indication of an unsuccessful mitigation of a network attack, an erroneous configuration of the network, or both.

17. The method of claim 1, further comprising revising a route filter on a network device to filter a particular malicious advertisement.

18. The method of claim 1, further comprising repeating one or more tests with different Autonomous System Number (ASN) hop counts to determine when anomalous messages are dropped.

19. The message of claim 1, further comprising obtaining a message template for at least one of the selected tests, the message template defining a structure of a generic anomalous message, and customizing the obtained message template based on one or more parameters of the corresponding test.

20. The method of claim 1, wherein the monitoring the performance of the network further comprises determining that the issued network configuration update failed to at least one of prevent and mitigate the attempt to establish the anomalous network configuration corresponding to the selected network test.

21. An apparatus comprising:
a memory; and
at least one processor, coupled to said memory, and operative to perform operations comprising:
selecting one or more network tests for a network, wherein the selected one or more network tests simulate an attempt to establish an anomalous network configuration;
generating a network configuration update based on the selected one or more network tests;
issuing the network configuration update to a network-based device;
establishing a relationship between a simulation sender and a simulation receiver;
monitoring a performance of the network for establishment of the anomalous network configuration in response to the network configuration update; and
revising a configuration of the network based on the monitored performance of the network, to mitigate the establishment of the anomalous network configuration, wherein the generation of the network configuration update is performed by the simulation sender and the monitoring of the performance of the network is performed by the simulation receiver.

22. The apparatus of claim 21, wherein the revised configuration mitigates malicious use of protected network addresses.

23. The apparatus of claim 21, the operations further comprising monitoring a security performance of the network over time.

24. The apparatus of claim 23, wherein the revising of the configuration of the network is based on the monitored security performance.

25. The apparatus of claim 21, wherein the simulated attempt to establish the anomalous network configuration includes an anomalous message and wherein the simulation sender and the simulation receiver transfer the anomalous message in conformance with a Border Gateway Protocol (BGP).

26. The apparatus of claim 21, wherein the monitoring the performance of the network further comprises determining that the issued network configuration update failed to at least one of prevent and mitigate the attempt to establish the anomalous network configuration corresponding to the selected network test.

27. A non-transitory computer readable medium comprising computer executable instructions which when executed by a computer cause the computer to perform the method of:
selecting one or more network tests for a network, wherein the selected one or more network tests simulate an attempt to establish an anomalous network configuration;
generating a network configuration update based on the selected one or more network tests;
issuing the network configuration update to a network-based device;
establishing a relationship between a simulation sender and a simulation receiver;
monitoring a performance of the network for establishment of the anomalous network configuration in response to the network configuration update; and
revising a configuration of the network based on the monitored performance of the network, to mitigate the establishment of the anomalous network configuration, wherein the generation of the network configuration update is performed by the simulation sender and the monitoring of the performance of the network is performed by the simulation receiver.

28. The non-transitory computer readable medium of claim 27, wherein the monitoring the performance of the network further comprises determining that the issued network configuration update failed to at least one of prevent and mitigate the attempt to establish the anomalous network configuration corresponding to the selected network test.

29. A networked computing system, the networked computing system comprising:
a management console, implemented using a first memory and at least one first processor, coupled to the first memory, and operative to perform operations comprising:
selecting one or more network tests for a network, wherein the selected one or more network tests simulate an attempt to establish an anomalous network configuration;
a simulation sender, implemented using a second memory and at least one second processor, coupled to the second memory, and operative to perform operations comprising:
generating a network configuration update based on the selected one or more network tests; and
issuing the network configuration update to a network-based device; and
a simulation receiver, implemented using a third memory and at least one third processor, coupled to the third memory, and operative to perform operations comprising:
participating in establishing a relationship between the simulation sender and the simulation receiver;

monitoring a performance of the network for establishment of the anomalous network configuration in response to the network configuration update; and reporting a result of the one or more tests based on the monitored performance of the network, to mitigate the establishment of the anomalous network configuration, wherein the management console, the simulation sender, and the simulation receiver, and the network-based device are each coupled to the network, wherein the generation of the network configuration update is performed by the simulation sender and the monitoring of the performance of the network is performed by the simulation receiver.

30. The networked computing system of claim 29, wherein the network configuration update mitigates malicious use of protected network addresses.

31. The networked computing system of claim 29, the operations further comprising monitoring a security performance of the network over time.

32. The networked computing system of claim 31, the simulation receiver further configured to revise the configuration of the network based on the monitored security performance.

33. The networked computing system of claim 29, wherein the simulated attempt to establish the anomalous network configuration includes an anomalous message and wherein the simulation sender and the simulation receiver transfer the anomalous message in conformance with a Border Gateway Protocol (BGP).

34. The networked computing system of claim 29, wherein the monitoring the performance of the network further comprises determining that the issued network configuration update failed to at least one of prevent and mitigate the attempt to establish the anomalous network configuration corresponding to the selected network test.

* * * * *